Sept. 16, 1958
M. F. PETERS
2,852,216
REFUELING CONDUIT
Filed Sept. 16, 1954
2 Sheets-Sheet 1
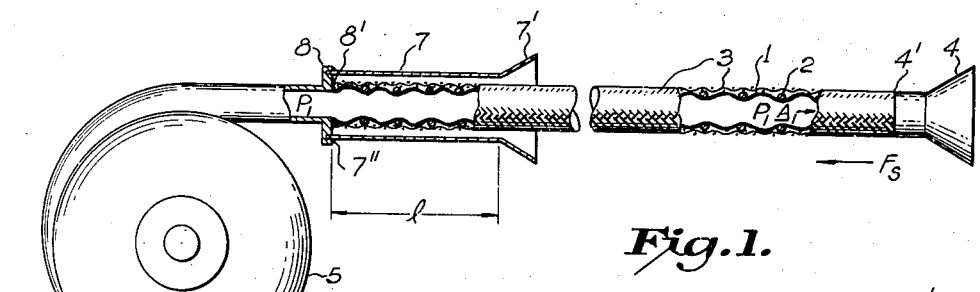
Fig.1.
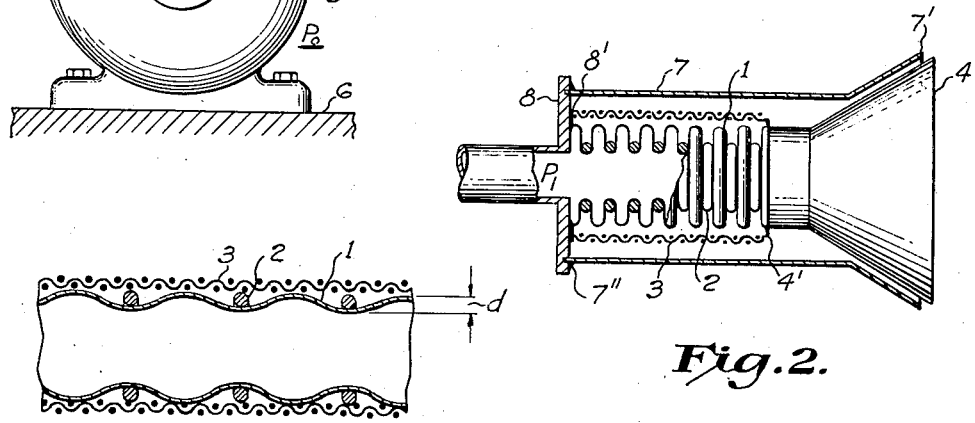
Fig.3.
Fig.2.
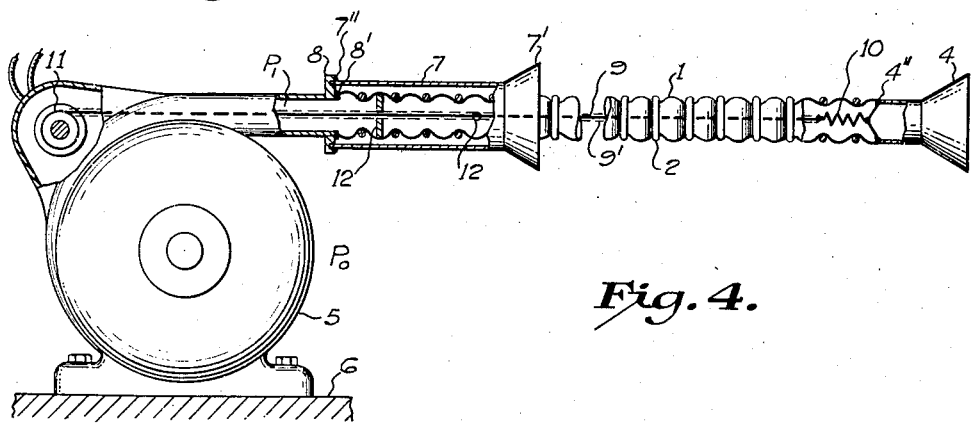
Fig.4.
INVENTOR.
Melville F. Peters
BY
Martin J. Finnegan Sept. 16, 1958
M. F. PETERS
2,852,216
REFUELING CONDUIT
Filed Sept. 16, 1954
2 Sheets-Sheet 2
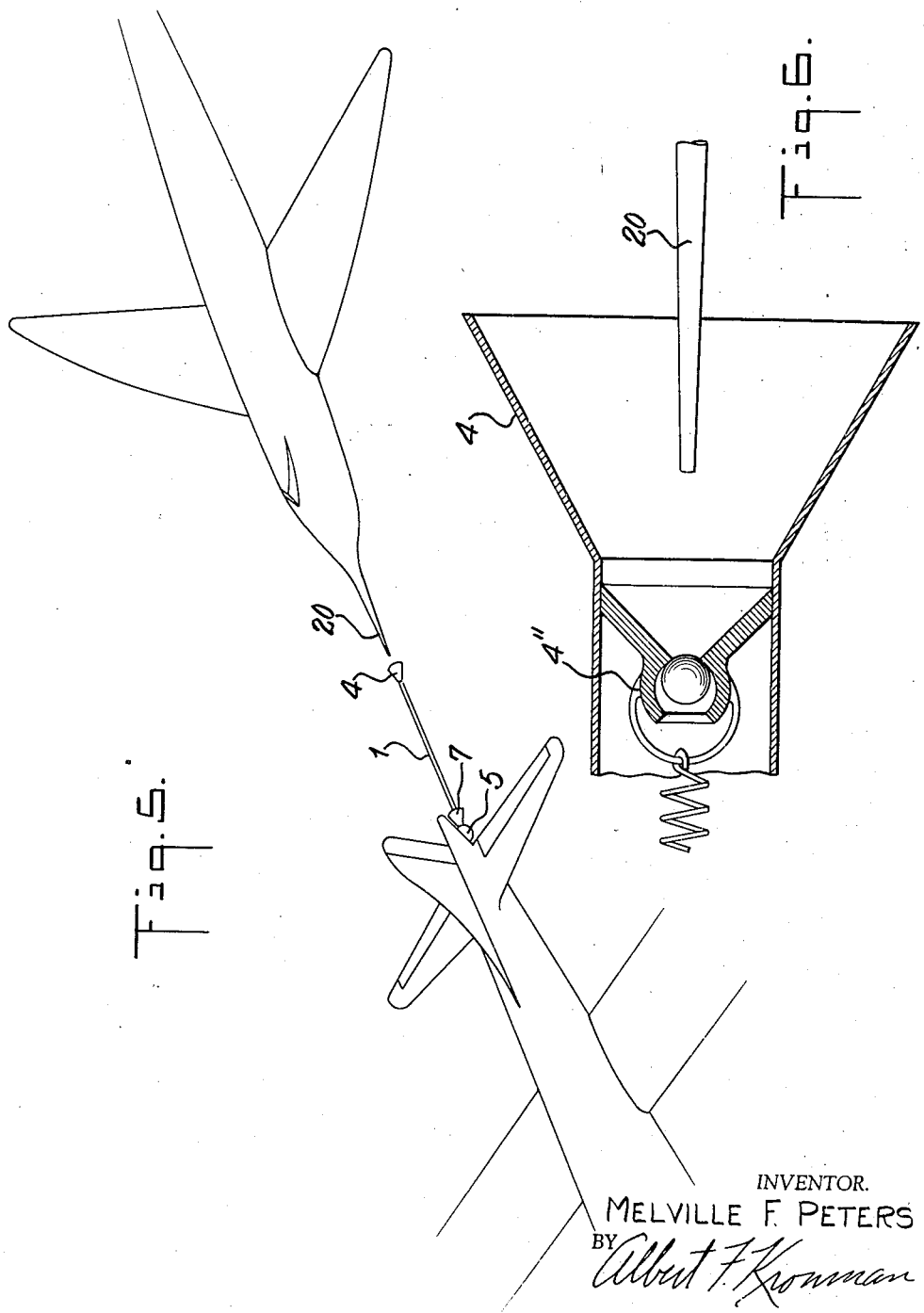
INVENTOR.
MELVILLE F. PETERS
BY
ATTORNEY

United States Patent Office 2,852,216
Patented Sept. 16, 1958

2,852,216

REFUELING CONDUIT

Melville F. Peters, Livingston, N. J.

Application September 16, 1954, Serial No. 456,547

3 Claims. (Cl. 244—135)

This invention relates to retractable conduit and particularly to flexible retractable conduit for refueling airplanes in flight.

The conventional refueling system on a tanker consists of a storage tank, a pump to remove the fluid fuel from the tank and force it through a rigid tube to a rotary seal and a drum which is used to wind a flexible hose which forms a fluid tight passageway between the rotary seal and the drogue. During the process of refueling the receiver aircraft, a portion of the flexible hose trails the tanker and after the refueling operation is finished, the trailing portion of the hose is wound on a drum. To simplify the system it is the first object of the invention to substitute a retractable conduit for the flexible conduit, the rotary seal and the drum.

To eliminate the drum and rotary seal it is necessary to use a conduit which can be elongated. Such a conduit can be formed by using the conventional convoluted structure with an elastic braid and use the air stream and fuel pressure to elongate the hose. It is therefore a second object of the invention to use an elastic braid in combination with the forces of restitution of the tubing, which permit the conduit to elongate to a predetermined length without damage and when this length is reached, the algebraic sum of the forces produced on the trailing end of the conduit by the fluid pressure, the air stream, the elastic braid and the tubing shall equal zero. During the refueling operation the relative speed between tanker and receiver will be changing, so that it is a third object of the invention to provide sufficient elasticity in the conduit to allow extension and contraction of the conduit during the refueling operation. It is a fourth object of the invention to reduce the frictional losses of the fuel flowing through the hose by reducing the height of the convolutions when the hose is in the extended position. It is a fifth object of the invention to adjust the rate of flow in the convoluted conduit, so that the drop in pressure is within the range wherein the energy expended in cavitation losses is at or near a minimum.

When conditions make it impracticable to rely on the elastic properties of the braid and tubing to control the elongation of the conduit, a cable, chain, or cord passing through the conduit with one end attached to the drogue and the other end to the winch may be substituted for the elastic braid. It is therefore a sixth object of the invention to control the length of the retractable conduit by connecting one end of a cable, chain, or cord to the trailing end of the conduit and the other end of the connecting element to a winch which is controlled through a fluid, electric, or magnetic drive, so that the cord will exert a constant force on the drogue by winding or unwinding the cord on the drum of the winch when the pull on the cord becomes greater or less than a predetermined value during the refueling operation. It is a seventh object of the invention to keep the cable, chain, or cord in the center of the conduit by placing suitably shaped spindles along the cable. It is an eighth object of the invention to cover the element when it is a conductor of electricity with a protective coating, so as to prevent galling or chafing when the element contacts the conduit and when the protective coating is an insulator of electricity, it prevents a short circuit between the element and conduit when the connecting element is used to conduct electricity. It is a ninth object of the invention to place a spring in the cable, chain, or cord between the drogue and a section of the element which is not coiled on the drum of the winch, so that vibrations and shock waves will be modulated by the spring. It is a tenth object of the invention to use a spring in the restraining cord of the conduit to allow the conduit assembly to increase in volume when the flow of fluid is suddenly stopped. It is an eleventh object of the invention to increase the hoop strength of the conduit by putting wires or cords between the corrugations or convolutions of the conduit.

This invention is not limited to placing the controlling element within the conduit and it is a twelfth object of the invention to replace the cable, chain, or cord within the conduit by using two or more connecting elements outside the conduit.

In the drawings:

Figure 1 is a cross sectional view of a fluid delivery system consisting of a fluid pump, retractible conduit with braid and conduit having elastic properties, a valve at the free end of the conduit and a combination guide and receptacle for the hose, an embodiment of the invention.

Figure 2 is a cross sectional view of the hose in the retracted or compressed condition, supported and enclosed by the receptacle, an embodiment of the invention.

Figure 3 is a cross sectional view of a section of the hose in the extended condition, an embodiment of the invention.

Figure 4 is a cross sectioal view of a retractible fluid delivery system similar to the system shown in Figure 1, except the length of the hose is controlled by a cable, chain, or cord passing through the conduit, an embodiment of the invention.

Figure 5 is a view in perspective showing the manner in which the present fluid delivery system is attached to and used by aircraft.

Figure 6 is a cross-sectional view of the end of the fluid delivery hose showing the valve means contained therein on a somewhat enlarged scale.

The flexible conduit shown in Figure 1 consists of convolutions 1 when the conduit is formed from strip and corrguations when formed from tubing. The hoop strength of the convoluted conduit can be increased by winding wire or cord 2 in spiral form between the convolutions or by placing reinforcing rings between the corrugations of the corrugated tubing. In either type of construction the supporting elements 2 can be held in place by putting the wire or rings in grooves at designated sections of the conduit, or by molding, welding or soldering the supporting elements into place, since material can be either organic or inorganic and is unlimited in kind except by the operating conditions of the fluid system. The braid 3 has elastic properties and will retract the tubing to approximately the length L when the pump is not running and the pressure $P_1$ within the conduit equals pressure $P_0$ outside the conduit. When the pump is started the pressure $P_1$ becomes greater than $P_0$ and the tubing is elongated. As $(P_1-P_0)$ is increased the trailing end of the conduit contacts the air stream, after which it is stretched until the forces produced by the air stream on the tubing and drogue together with the force $(P_1-P_0)A$ acting on the end of the tubing where $A$ is the cross sectional area of the tubing, is equal to and opposite in direction to the force $F_s$ produced by the spring action of the elastomer braid 3 and the spring action of the tubing. When the relative rates of speed of tanker and receiver changes, the elastic properties of the braid compensates for the change in the relative position of the two airplanes. At 7 is shown a guiding conduit with one end supported at 8 and the other end flared to receive and support the drogue 4 when the pump is stopped and the pressure $P_1$ is equal to the pressure $P_0$. The conduit is attached to the drogue at 4' and to the pump 5 at 8'. A support for the pump is shown at 6.

Figure 2 shows the conduit in a compressed position which occurs when the pressure $P_1$ is equal to $P_0$ and the forces produced by the elastic properties of the braid are great enough to overcome the forces produced by the air stream acting on the conduit and drogue. The drogue 4 is resting and supported by the clamp holder 7'.

In Figure 3 the conduit is shown elongated until the depth of the convolutions or corrugations are reduced to remove the sharp edges at their bases so that the resistance to the flow of fluid through the conduit approaches the resistance to the flow of the fluid through a non-convoluted conduit.

The arrangement shown in Figure 4 is similar to the arrangement in Figure 1, except the cable, chain, or cord 9 can be used to control the extension of the conduit or position of the drogue when the forces produced by the air stream on the hose, or the weight of the hose, is so great that it becomes impractical to use the elastic properties of the braid and conduit to control the extension of the conduit. The hose 1 can be used with or without the protective braid 3 shown in Figure 1. When the hose is not in use the cable, chain, or cord is wound on the drum of the winch 11, so that the hose is compressed into 7 and the drogue 4 is supported by 7'. The winch 11 is coupled to the motor by a fluid, electrical, or magnetic drive, so that the tension on the connecting element can be held constant, or the stresses developed in the connecting element or reel can serve as a part of a control device by conducting the changes in stress to the power plant of the tanker, so that the output of the tanker power plant and consequently the speed of the tanker can be controlled by the stresses developed in 9 or 11. The protective coating 9' on 9 reduces the galling on the conduit when the centering beads 12 are not used and if the coating is an insulator of electricity it prevents a short circuit between 1 and 9 when the connecting element is used as a conductor of electricity. The spring at 10 permits the conduit to change in length when oscillations are set up in the probe, or to allow the conduit to elongate when the probe 20 is accidentally removed from the drogue during the refueling operation, so that it has the same effect in limiting the pressure in the conduit as a surge chamber in the drogue. The drogue valve 4" prevents the escape of fluid from the conduit 1 until the probe is inserted therein.

When the resistance to the flow of fluid through the conduit must be kept low, or the viscosity of the liquid is high, the drop in pressure through the conduit can be reduced by replacing element 9 by two or more elements outside the cable.

In the appended claims the word "cable" is intended to include a chain, cord, spring, or multiple units or combinations of such elements, and the words "convoluted conduit" are intended to include all known forms of conduits having corrugations, convolutions, beads, ribs, or other formations facilitating extension and retraction.

What is claimed is:

1. An apparatus for transferring fuel from one aircraft to a second aircraft equipped with a fluid receiving probe engageable with said apparatus, comprising a pump, inlet and outlet means on said pump, said outlet means including an extensible, flexible conduit attached at one end to the pump, said conduit being of a circular cross section that maintains a minimum internal diameter at all times, a layer of braid having elastic properties extending over the complete length of said conduit, a valve yieldably closing the free end of said conduit, said valve being operated by the probe of the second aircraft, and a rigid tubular support spaced from the free end of the conduit and secured to the pump to receive therein the flexible conduit when it is in the compressed position.

2. An apparatus for transferring fuel from one aircraft to a second aircraft equipped with a fluid receiving probe engageable with said apparatus, comprising a pump, inlet and outlet means on said pump, said outlet means including an extensible, flexible conduit attached at one end to the pump, said conduit being of a circular cross section that maintains a minimum internal diameter at all times, a layer of braid having elastic properties extending over the complete length of said conduit, a valve yieldably closing the free end of said conduit, said valve being operated by the probe of the second aircraft, a winch carried within the pump, a cable connected at one end to the winch and at its other end to the valve end of the conduit.

3. Apparatus according to claim 3 wherein the conduit is provided with a plurality of spaced spiders internally carried therein and the cable is slidably received through central openings in the spiders.

References Cited in the file of this patent

UNITED STATES PATENTS

| | | |
|---|---|---|
| 1,969,430 | Shinn | Aug. 7, 1934 |
| 2,000,679 | Walter | May 7, 1935 |
| 2,085,563 | Aime | June 29, 1937 |
| 2,247,406 | Raymond | July 1, 1941 |
| 2,254,157 | Shaw | Aug. 26, 1941 |
| 2,644,487 | Schindler | July 7, 1953 |
| 2,663,523 | Leisy | Dec. 22, 1953 |

FOREIGN PATENTS

| | | |
|---|---|---|
| 346,181 | Great Britain | Apr. 9, 1931 |
| 833,205 | France | July 18, 1938 |